United States Patent [19]

Loppönen et al.

[11] Patent Number: 5,781,860
[45] Date of Patent: Jul. 14, 1998

[54] METHOD FOR CONTROLLING SUBSCRIBER STATIONS IN A RADIO-TELECOMMUNICATIONS SYSTEM

[75] Inventors: Jussi Loppönen, Helsinki; Mika Heiskari, Espoo, both of Finland

[73] Assignee: Nokia Telecommunications Oy, Espoo, Finland

[21] Appl. No.: 601,037

[22] PCT Filed: Aug. 25, 1994

[86] PCT No.: PCT/FI94/00374

§ 371 Date: Apr. 22, 1996

§ 102(e) Date: Apr. 22, 1996

[87] PCT Pub. No.: WO95/06395

PCT Pub. Date: Mar. 2, 1995

[30] Foreign Application Priority Data

Aug. 26, 1993  [FI]  Finland ..................... 933764

[51] Int. Cl.$^6$ .................. H04B 1/00; H04M 1/00
[52] U.S. Cl. .................. 455/426; 455/403; 455/422; 455/438; 455/11.1
[58] Field of Search .................. 455/403, 407, 455/411, 417, 425, 426, 42, 8, 17, 11.1, 15, 67.1, 422

[56] References Cited

U.S. PATENT DOCUMENTS

| | | | |
|---|---|---|---|
| 4,534,061 | 8/1985 | Ulug | 455/17 |
| 4,716,407 | 12/1987 | Borras et al. | 340/825.04 |
| 4,850,033 | 7/1989 | Eizenhöfer et al. | 455/33 |
| 5,355,511 | 10/1994 | Hatano et al. | 455/11.1 |
| 5,423,055 | 6/1995 | Diaz et al. | 455/17 |

FOREIGN PATENT DOCUMENTS

| | | |
|---|---|---|
| 2 063 011 | 5/1981 | United Kingdom. |
| 2 151 883 | 7/1985 | United Kingdom. |
| 2 244 890 | 11/1991 | United Kingdom. |
| 87/01537 | 3/1987 | WIPO. |
| 94/17642 | 8/1994 | WIPO. |

OTHER PUBLICATIONS

Using Radio Links, G.E. Dodrill et al, IRE National Meeting, Jan. 1993.

*Primary Examiner*—Donnie L. Crosland
*Attorney, Agent, or Firm*—IP Group of Pillsbury Madison & Sutro LLP

[57] ABSTRACT

In a radiotelecommunications system where some of the subscriber stations are able to communication with one another on a direct mode channel, to direct subscriber stations to one and the same direct mode channel, a command that contains the channel identifier of the direct mode channel is sent to the subscriber stations. The subscriber stations move, in response to the channel identifier, to the direct mode channel indicated by the channel identifier, whereby each subscriber station is able to communicate with the other subscriber stations directed to same direct mode channel.

9 Claims, 2 Drawing Sheets

METHOD FOR CONTROLLING SUBSCRIBER STATIONS IN A RADIO-TELECOMMUNICATIONS SYSTEM

FIELD OF THE INVENTION

The invention relates to a method for controlling subscriber stations in a radiotelecommunications system, in which at least some of the subscriber stations can communicate with one another on a direct mode channel.

The invention also relates to a radiotelecommunications system comprising one or more subscriber stations, at least some of which are able to communicate with one another on a direct mode channel, and a dispatcher controlling the subscriber stations.

The invention further relates to a subscriber station in a radiotelecommunications system, comprising a memory means, a transceiver for tuning to each radio channel used, a user interface for transmitting information between the user and the subscriber station, and a controller for controlling the operation of the subscriber station in response to the commands received from the user interface.

BACKGROUND OF THE INVENTION

The invention concerns trunked radiotelecommunications systems. A trunking system is a separate radio network offering the services of a company-specific radio network to a plurality of organizations by means of common use of radio channels. Trunking systems comprise exchanges, base stations and mobile stations, and they typically have a cellular structure, in which each cell comprises one or more radio channels, one or more of which are used for signalling while the others are used as traffic channels. Signalling channels are used for call set-up, registration, etc. Traffic channels are used for transmitting voice, and for switched data connections. In addition to these 'system channels', a radio system can employ 'direct mode channels' (direct-mode channels), which are frequencies at which mobile stations can communicate directly with one another, without involving base stations of the system.

Typically, direct mode channels are used e.g. when a number of portable mobile stations communicate with one another so far away from the base station that system channels cannot be used. This is typical of radio systems in scarcely-populated areas, where radio coverage is provided in view of vehicle-mounted mobile stations with high transmission power. Portable mobile stations have lower transmission power, and so a signal transmitted by a mobile station does not reach the base station. For economic reasons, it is usually not sensible to provide peripheral areas with a dense base station network that would provide radio coverage for portable mobile stations. In operations taking place in these peripheral areas, communication within e.g. a working group can be implemented by portable mobile stations using direct-mode channels.

Another important use of direct-mode channels is that it provides additional capacity as traffic increases rapidly in one e.g. point-like part of the service area of the system. Typically this kind of need arises in closed radio networks used by authorities; in them, it is not economically sensible to provide so much base station capacity that the necessary channels would be available in the event of an incident. Such an incident is, for example, an airplane crash occurring in the countryside, whereby the authorities may need even hundreds of telephones instantaneously in an area where normally only a few mobile stations are used. Because of this, direct mode channels are used even if the mobile stations are within the coverage area of the base stations of the system.

A direct mode channel is also called a simplex channel or connection. A direct mode channel is a channel that is typically not used by the base station of the system at all. It is not a pair of frequencies, but only a single channel with the same width as the channels of the system, e.g. 12.5 kHz or 25 kHz. A transmitting mobile station operating on the direct mode channel has tuned its transmitter to the channel, and transmits voice or data. The other mobile stations in the direct mode have tuned their receivers to the same channel, and so they are able to directly listen to the transmitted message.

On a direct mode channel, both analog and digital modulation are possible. A mobile station transmitting on the channel may also transmit signalling data, e.g. on authorization and priority or the group operating on the channel. On a direct mode channel, voice can be transmitted in encrypted or plain form.

In prior art systems, mobile stations are directed to direct mode channels by a dial-up sequence given by the user: the mobile or subscriber station user keys a certain dial-up sequence in the user interface of his or her mobile station. This is naturally a troublesome task, and it requires accuracy. Above all, the radio-telecommunications system or its dispatcher does then not receive information whether the desired mobile station has moved to the desired direct mode channel.

Further, the direct mode channels used in the prior art systems are permanently programmed in the memories of the mobile stations, and so the users must have agreed beforehand on the direct mode channels to be used. It is then very troublesome to transfer a direct mode channel to another frequency, since each mobile station has to be re-programmed manually when the frequency of a direct mode channel is to be changed.

Another problem with the prior art solutions is that the users are not informed of the activity of the direct mode channels, i.e. the user is not aware which direct mode channel/channels is/are allocated to him or her. Further, direct mode channels cannot be assigned to a group, so that, e.g., all subscribers belonging to a specified group call group would use a specific direct mode channel.

DESCRIPTION OF THE INVENTION

The object of the invention is to provide a method and system for automatically directing a subscriber station to a desired direct mode channel.

Another object of the invention is to provide a subscriber station which according to the invention has an overriding priority or a possibility to move to the desired direct mode channel.

Naturally, the object of the invention is also to provide a method, system and subscriber station by which the problems of the prior art solutions can be avoided.

This new kind of method for controlling subscriber stations in a radiotelecommunications system is achieved with the method of the invention, which is characterized in that at least some of the subscriber stations are directed to the same direct mode channel in such a way that a command (FIG. 3) that contains the channel identifier of the direct mode channel is transmitted to the subscriber stations, and that in response to said command the subscriber stations move to the direct mode channel indicated by the respective channel identifier, whereby each subscriber station is able to directly communicate with the other subscriber stations directed to the respective direct mode channel.

The invention also relates to a radiotelecommunications system, which is characterized in that the dispatcher contained in the radiotelecommunications system comprises means for transmitting a command that contains the channel identifier of the direct mode channel to the respective mobile stations so as to direct at least some of the respective subscriber stations to the desired direct mode channel.

Further, the invention relates to a subscriber station in a radiotelecommunications system, which is characterized in that the memory means of the subscriber station is arranged to store the direct-channel identifier contained in the command received by the subscriber station, and that the subscriber station controller comprises means for tuning the transceiver of the subscriber station either by user control or by an overriding priority to communicate on the direct mode channel indicated by the channel identifier of the direct mode channel with the other subscriber stations communicating on the respective direct mode channel.

The basic idea of the invention is that a command that contains the desired direct-channel identifier is transmitted to the subscriber station, and that in response to the command, the subscriber station moves to the desired direct mode channel. The command may contain a priority, which the subscriber station compares with the priority of the on-going call. If the priority contained in the command is higher than that of the on-going call, the subscriber station moves to the desired direct mode channel by an overriding priority, and if the command has the same or a lower priority than the on-going call, the subscriber station user may direct the subscriber station by means of the user interface to the desired direct mode channel or to some other channel for communication.

This kind of method for controlling subscriber stations in a radiotelecommunications system, radiotelecommunications system and subscriber station in a radiotelecommunications system has the advantage that according to the invention, direct mode channels can be dynamically programmed in mobile stations in exactly the way that either the system controller or the dispatcher desires. Subscriber stations, or mobile stations, can even be directed to the desired direct mode channel group-specifically, whereby channel capacity can be transferred from a low-traffic area to a high-traffic area e.g. according to the need.

A further advantage of the invention is that when mobile stations are commanded to move to direct mode channels group-specifically, direct mode channels can be used in situations where much radio capacity is needed in some small geographical area instantaneously, i.e. in the event of an 'incident', to replace system channels. The person in charge may assign units to suitable channels, without checking whether or not they find radio air time. With the invention, the person in charge can be sure that the desired subscriber stations move to the desired direct mode channel, if a message is sent that the subscriber stations have an overriding priority to move to the direct mode channel. This is implemented by a sufficiently high priority.

The invention is also advantageous in situations where it is found desirable to command the mobile stations to direct mode channels since the system channels are being intentionally jammed. This kind of jamming may be implemented, e.g. by a jammer that is disposed in the vicinity of a base station at an uplink frequency and prevents the base station from receiving a transmitted signal. In the invention, when a dispatcher receives information about intentional jamming, it can command the mobile stations to move to direct mode channels for mutual communication. This is a way of eliminating the most common kind of jamming of a police radio network, in which there is a jammer in the vicinity of the base station, jamming the up-link and making it impossible for the base station to distinguish and thereby receive signals transmitted by the mobile stations. But now that mobile stations far away from the base stations communicate directly with one another, a jammer situated in the vicinity of the base station is no longer able to interfere, since the field strength of the jamming signal decreases as a function of distance. This settles at least a situation where the power of the jammer is not very high.

Yet another advantage of the invention is that the overriding priority to move to the direct mode channel makes it possible to command the radio units that cannot simultaneously monitor both the system and the direct mode channel (dual watch) to move from a system channel to a direct-mode channel.

BRIEF DESCRIPTION OF THE DRAWINGS

In the following, the invention will be described in greater detail with reference to the attached drawings, in which.

DETAILED DESCRIPTION OF A PREFERRED EMBODIMENT OF THE INVENTION

Figure 1:
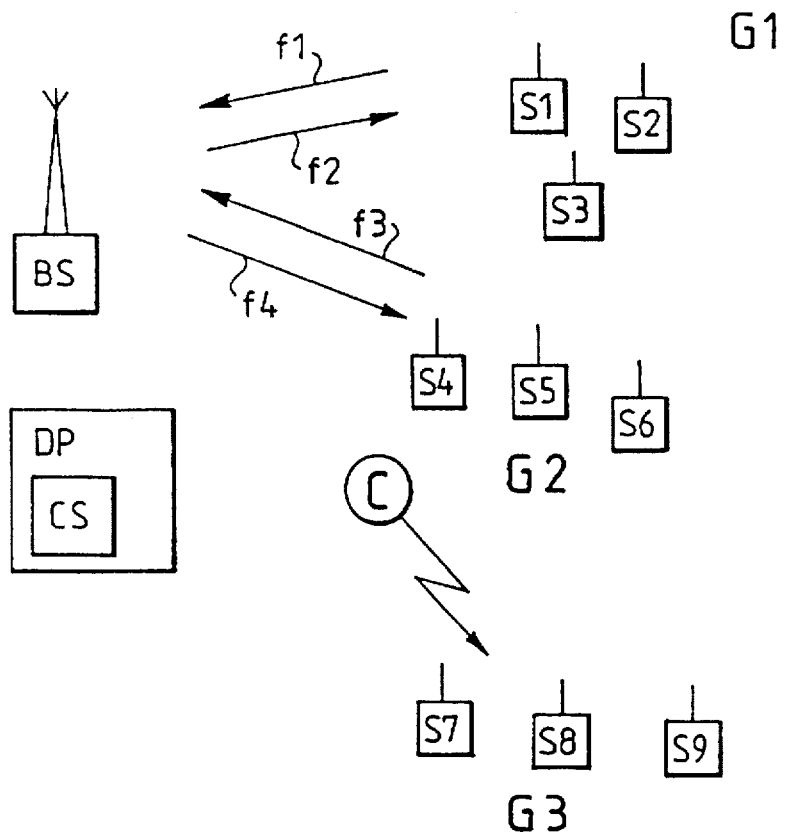
FIG. 1 shows a radiotelecommunications system in a situation where the invention is used for directing subscriber stations to a direct mode channel.

FIG. 1 shows a radiotelecommunications system in a situation where the invention is used for directing subscriber stations to a direct mode channel. In FIG. 1, the traffic channels of a base station BS are busy, since frequencies f1 and f2 are reserved for traffic between the base station and group G1, which comprises subscriber stations S1, S2, S3. Further, frequencies F3 and f4 are reserved for traffic between the base station and group G2, which comprises subscriber stations S4, S5, S6. Since the base station BS does not have any more channels available, it has not been possible to allocate a channel to group G3, which comprises subscriber stations S7, S8, S9. In this situation, the members of group G3 can ask the dispatcher DP to allocate a direct-mode channel to them. The subscribers of group G3 can request a direct mode channel e.g. by transmitting a data message on a signalling channel. When the system, e.g. the dispatcher DP, receives the request, it commands group G3 to move to a suitable direct mode channel fD by transmitting a command C to the subscribers of group G3, or to all subscribers of the system in such a way that the subscribers of the object group G3 pick the data intended for them. The dispatcher gives the commands by means of a terminal, which may be, e.g., a computer connected to a mobile station. The dispatcher comprises means for transmitting a command that contains a direct-channel identifier to the desired mobile stations in order to direct the desired subscriber stations to the desired direct mode channel. Beyond the coverage area of portable mobile stations, the dispatcher may be a mobile station, typically a high-power vehicle-mounted mobile station that may be connected with the system channels. Also, the dispatcher may have a permanent connection with the radiotelecommunications system or it may be part of it, its mobile exchange or base station. Further, the mobile exchange of the radiotelecommunications system comprises similar means for transmitting commands as the dispatcher. The mobile exchange of the radiotelecommunications system then allocates system capacity in the way it sees appropriate. Commands can also be given to direct mode channels or direct mode channels can be programmed via direct mode channels, the condition being that the direct mode channel supports a signalling protocol of a sufficient level. A subscriber station or subscriber stations is/are thus directed to a specific direct mode channel by transmitting a respective command to the direct mode channel.

Subscriber stations are directed to direct mode channels in such a way that a dispatcher, which is, e.g., a terminal, sends either the mobile exchange or a mobile station a command to move to a direct mode channel. These, in turn, transmit the command on a radio path, the mobile station naturally first sending it to the mobile exchange, which in turn transmits the data over the down-link to the desired mobile stations. Another alternative, if the dispatcher can have a radio connection with the subscriber stations that it wants to transfer to a direct mode channel, is that the dispatcher sends the command to move to a direct mode channel directly to the subscriber stations. In any case, when the desired subscriber stations receive the command, e.g. the subscriber stations of group G3 store in their memories the data contained in the command. If the command contains a priority indication, the subscriber stations compare priorities and conclude therefrom whether they should transfer to a direct mode channel or only indicate the possibility of using a direct mode channel to the subscriber station user and let the user decide whether he or she moves to the direct mode channel.

The following is a closer description of what happens when a subscriber station receives a command to move to a direct mode channel. First the subscriber station checks whether the message is addressed to it. If it is, the operation continues, and the subscriber station stores the data on the direct mode channel in its memory if the direct mode channel has not already been programmed. The storing is performed, e.g. by storing the direct-channel identifier among the permanent channels if the command has an individual address, and in the volatile memory if it is addressed to a group or to all mobile stations. After this, the subscriber station acknowledges the command if it had an individual address and moves to the channel if it had an overriding priority, i.e. if, e.g., the message had a sufficiently high priority indication. If, on the other hand, the priority is not sufficiently high to justify overriding, the subscriber station gives the user a visual or voice indication about an activated direct mode channel via the user interface, whereby the user may respond via the user interface whether he or she wants to transfer the subscriber station to the direct mode channel.

A direct mode channel can be given to a group by addressing, whereby only one channel is stored in the mobile station, and it can be erased when power is cut off from the mobile station. It is thus possible to make sure that wrong direct mode channels have not been programmed in the mobile stations.

If a channel is to be programmed permanently, a message must be addressed to an individual mobile station, which acknowledges; the transmitter can thus keep a record of the transmitted commands and their effect. Likewise, a permanent channel can be erased only by an acknowledged message addressed to an individual mobile station.

Figure 2:
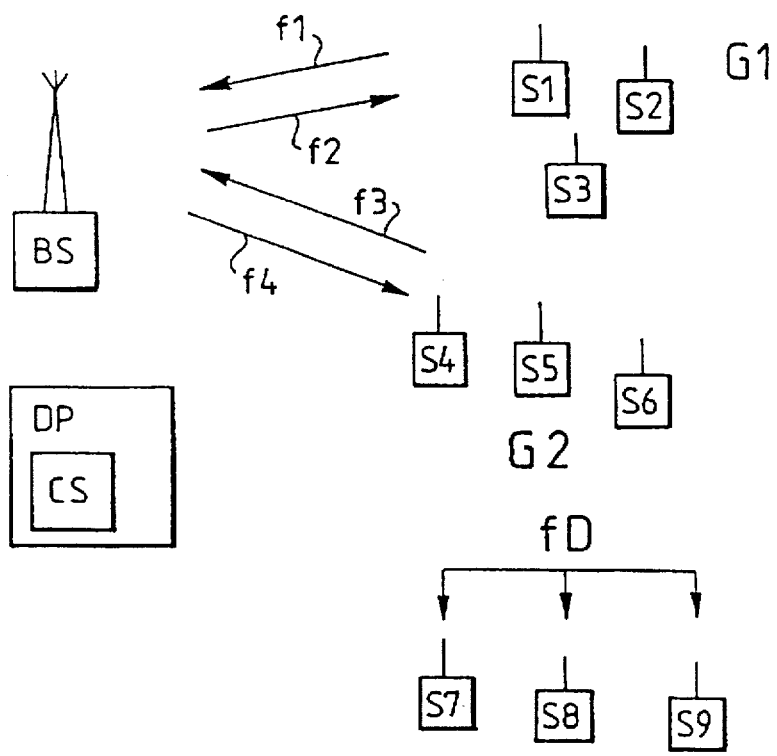
FIG. 2 shows a radiotelecommunications system in a situation where the invention has been used for directing subscriber stations to a desired direct mode channel.

FIG. 2 shows a radiotelecommunications system in a situation where the invention has been used for directing subscriber stations to a desired direct mode channel. The subscribers S7, S8, S9 of group G3 then communicate on the direct mode channel fD without being blocked.

Figures 3, 4, 5:
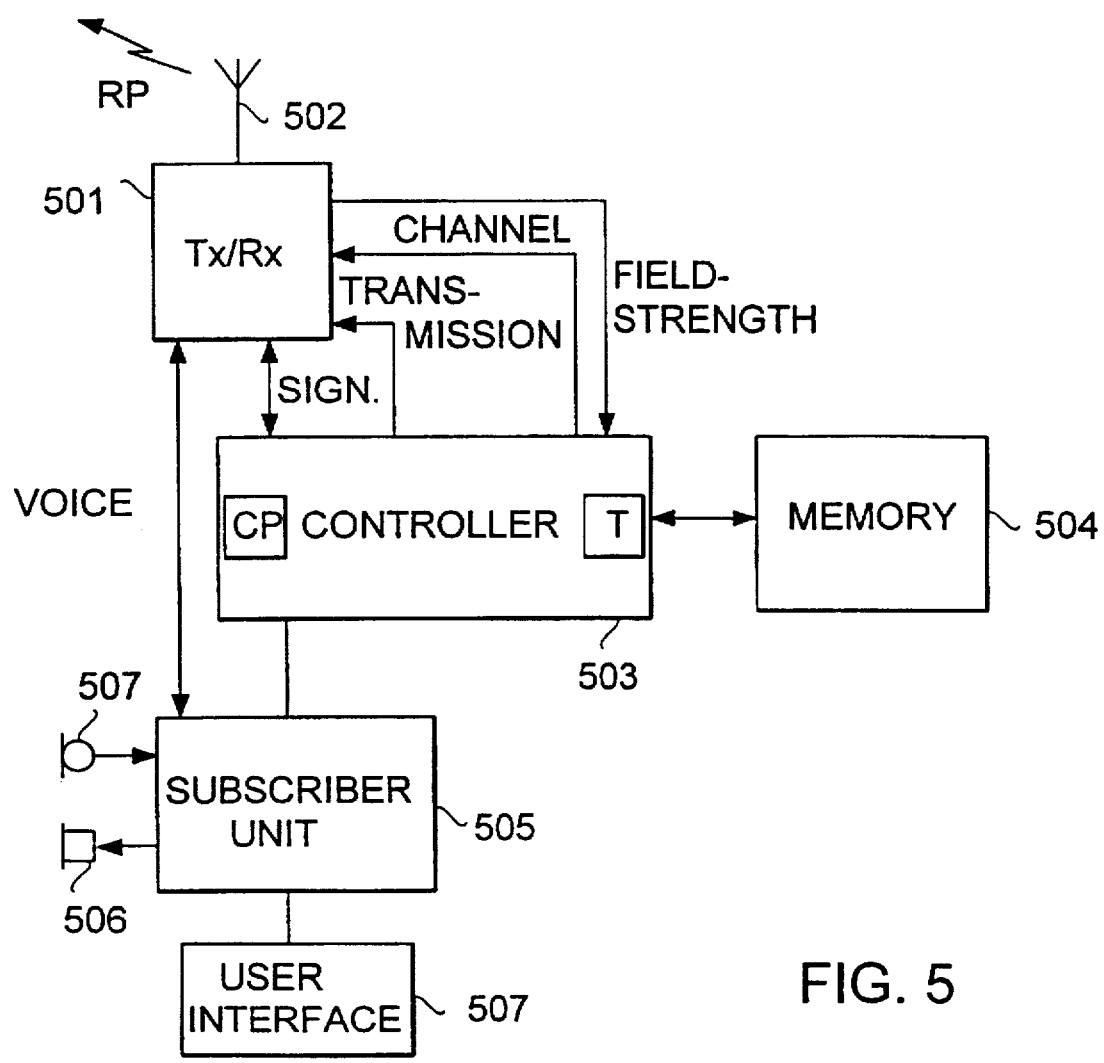
FIG. 3 shows a command according to the invention.
FIG. 4 shows an erase message according to the invention.
FIG. 5 shows a block diagram of a subscriber station, or mobile station, of the radio system according to the invention.

FIG. 3 shows a command according to the invention. FIG. 3 shows the frame structure of the command. Field 31 is the frame identifier of the radiotelecommunications system. Field 32 is the address of the receiver; it may be the address of an individual, e.g. a phone number, or the address or identifier of a group, e.g. the identifier of a group call group. Field 32 may also indicate that the command is broadcast to all subscribers within the service area of a certain base station, mobile exchange or radiotelecommunications system. Field 33 is the address of the transmitter. Field 34 is the message identifier, i.e. the identifier of a command directing to a direct mode channel. Field 35 is the number of the direct mode channel to which the subscriber station/stations is/are desired to move. Field 36 is a priority; it indicates the command priority of the command shown in FIG. 3. If the priority is high, the message has an overriding priority. The subscriber station that has received the command analyzes the priority of the command and compares it with the priority of the on-going call, and if the priority of the command is higher than that of the call, the subscriber station moves to the direct mode channel indicated by field 35 of the command for communication. If, on the other hand, the priority of the command is the same as or lower than that of the call, the identifier and/or frequency of the direct mode channel indicated by field 35 are/is stored in the memory means of the subscriber station, and the subscriber station user may choose, via the user interface, whether he or she starts to communicate on the respective direct mode channel or communicates on some other channel. Field 37 may contain an instruction or indication that forces the subscriber station to move to a direct mode channel regardless of the priority. Field 38 may contain a definition of the period that the direct mode channel is valid, i.e. the period for the duration of which the respective direct mode channel is available to the subscriber stations. Field 39 may contain the identifier of the area where those subscribers are situated that are desired to be transferred to the direct mode channel indicated by field 35 of the command. This area may be a service area or location area LAI (=location area identifier) of base stations, mobile exchanges or base station controllers. Field 30 again contains the frame identifier of the radiotelecommunications system.

It is thus possible to include in the command a piece of information indicating to the mobile exchange to which base station sites the command is to be transmitted. The command can be addressed to a group, an individual mobile station, or to all mobile stations that are listening. For example, the system may have a certain type of message that is always received by all mobile stations that are listening, or a certain address may be defined in such a way that all those listening are receiving. In a directing message, a corresponding method is employed in this so called broadcast transmission.

A command may thus be addressed either to all mobile stations, to a group, or to an individual mobile station. It is possible to address the command only to certain base station sites (area selection). It is also possible to program a new direct mode channel in a mobile station either permanently, using, e.g., an individual number, or in the RAM, from which the command is erased as power is cut off from the mobile station. Further, it is possible to inform that an existing direct mode channel has been activated and, if necessary, to direct a mobile station to the direct mode channel by giving it an overriding priority. It is to be understood that these operations can be performed via the direct mode channels themselves, i.e. a command can be transmitted on a direct mode channel. The command can also be transmitted to mobile stations involved in a call, whereby also they can be commanded to/informed of the direct mode channel.

The messages sent on a direct mode channel thus contain the same fields as the messages of the system channels, but the detailed structure may vary with the signalling.

FIG. 4 shows an erase message according to the invention. A direct mode channel, or a temporary channel, which has been used for traffic within a group, can be erased by a single message addressed to the whole group. On the other hand, mobile stations may also have direct mode channels that cannot be erased. In the erase message of FIG. 4, field 41 is the frame identifier of the radiotelecommunications system. Field 42 is the address of the receiver. Field 42 is the address of the transmitter. Field 44 is the message identifier, i.e. a piece of information indicating that the message is an erase message for erasing a direct mode channel. Field 45 indicates the channel of the direct mode channel to be erased. Field 46 is again the frame identifier of the radiotelecommunications system. It is to be noted that the erase message may contain fields that correspond to fields 36 to 30 of the command, defining where and when the message is valid and indicating its priority.

The structure of the messages shown in FIGS. 3 and 4 is presented by way of an example. Depending on the system, e.g. existing message structures can be employed, giving them additional meanings and using subfields.

FIG. 5 shows a typical subscriber station, i.e. the structure of a mobile station used by the subscriber. The task of a transceiver (TX/RX) 501 is to tune to the channel used. With the transceiver 501 is connected an antenna 502, which is connected with the radio path RP. Radio frequencies in the range of 60 to 1000 MHz (VHF and UHF ranges) are usually used. On the radio path RP, analogue modulation can be used, the modulation being then usually phase modulation. Other kinds of modulation can also be used. Signalling can be transmitted, e.g. by a voice-frequency subcarrier wave (FFSK). Transmission on a radio path can also be digital.

A subscriber unit 505 may comprise electro-acoustic transducers, typically a headphone 506 and a microphone 507, and optionally buttons in a user interface 507 for starting and ending a call, and for dialling. Since in a trunking system, transmission on a radio path RP is advantageously unidirectional, the subscriber station usually also has a push-to-talk button that must be depressed when transmitting. However, also duplex traffic is possible.

The task of a controller 503 is to control the operation of the subscriber station. The controller 503 is connected with the subscriber unit 505, from which it receives signals, e.g. for starting and ending a call. The controller 503 may also give the user, via the subscriber unit 505 or the user interface 507, voice or visual signals that relate to the operation of the mobile station and/or the radiotelecommunications system.

The controller 503 is connected with the transceiver TX/RX 501. The channel employed by the transceiver is determined by the controller 503, i.e. the transceiver 501 tunes to the channel, or radio frequency, determined by the controller 503. The transceiver 501 is also switched on by the controller 503. The controller 503 receives and transmits signalling messages via the transceiver 501.

With the controller 503 is connected memory means 504, which contains both permanent and changing data. The permanent data include, e.g., the subscriber number of the subscriber station, the numbers of the groups to which the subscriber station belongs, and the radio channels belonging to the system. The changing data include the mode of the subscriber station, e.g. idle mode, call set-up mode, call mode, and e.g. data indicating the channel to which the station is tuned. The memory means 504 of the subscriber station according to the invention is arranged to store the direct-channel identifier contained in the command received by the subscriber station, and other data needed in moving to a direct mode channel.

The subscriber station controller 503 further comprises means T for tuning the transceiver of the subscriber station by user control or by an overriding priority to communicate on the direct mode channel indicated by the direct-channel identifier with the other subscriber stations communicating on said direct mode channel. The subscriber station controller 503 further comprises means CP for comparing the priority 36 contained in the command C (FIG. 3) received by the subscriber station with the priority of the call in which the subscriber station has participated and, if the priority 36 of the command is higher than that of the call in which the subscriber station has participated, for tuning the transceiver 501 of the subscriber station by an overriding priority to communicate on the direct mode channel fD indicated by the direct-channel identifier 36 with the other subscriber stations communicating on the respective direct mode channel fD.

The drawings and the description thereof are to be understood only as illustrating the idea of the invention. The method of the invention for controlling subscriber stations in a radiotelecommunications system, a radiotelecommunications system, and a subscriber station in a radiotelecommunications system may vary in their details within the scope of the claims. Although the invention is described above primarily as applied in a trunking system, it may be employed in other kinds of radio systems also, e.g. in mobile station systems.

We claim:

1. A method for controlling subscriber stations in a trunked radiotelecommunications system which includes at least one exchange, at least one base station, and a plurality of subscriber stations sharing radio channels, the subscriber stations having respective user interfaces in which system at least some of the subscriber stations can communicate with one another on a same direct mode channel having a channel identifier, the method comprising the steps of:

directing at least some of the subscriber stations to said direct mode channel, by transmitting a command that contains the channel identifier of said direct mode channel to the respective said subscriber stations, in response to receiving said command, the respective said subscriber stations moving to said direct mode channel indicated by said channel identifier, whereby each respective said subscriber station is able to directly communicate with the others of the respective said subscriber stations directed to said direct mode channel, and informing the user of each subscriber station directed to the direct mode channel via the user interface of the respective said subscriber station that the respective said subscriber station can communicate on said direct mode channel.

2. The method according to claim 1, further comprising the steps of:

providing said command with a priority indication, analyzing the priority of the received command in each respective said subscriber station, as a result of the said analyzing, directing each respective subscriber station to said direct mode channel indicated by aid channel identifier by one of:

user control, and an overriding priority if the priority indication contained in said command is sufficiently high.

3. The method according to claim 2, wherein said analyzing comprises:

each respective said subscriber station comparing the priority indication contained in said command with the priority of an on-going call in which the respective said subscriber station is currently engaged, and if the priority indication contained in said command is higher than that of said on-going call, the respective said subscriber station moving by said overriding priority to said direct mode channel indicated by said channel identifier contained in said command, for communication.

4. The method according to claim 2, wherein said analyzing comprises:

each respective said subscriber station comparing the priority indication contained in the said command is lower than that of said on-going call, the subscriber station user commanding the subscriber station to move to said direct mode channel, for communication, by means of the respective said user interface.

5. The method according to claim 1, comprising:

transmitting said channel-identifier-containing command, which directs the subscriber station to the desired direct mode channel, is transmitted to said direct mode channel.

6. A trunked radiotelecommunications system, comprising:

at least one exchange, at least one base station, a plurality of subscriber stations, at least some of which are able to communicate with one another on a same direct mode channel having a channel identifier, and each having a user interface, at least one exchange being arranged to allocate channel resources among said subscriber stations, and a dispatcher controlling the respective said subscriber stations which are able to communicate with one another on said direct mode channel and comprising means for transmitting a command that contains said channel identifier of said direct mode channel to the respective said subscriber stations so as to direct at least some of said subscriber stations to said direct mode channel and to inform the user of each subscriber station so directed, via the respective said user interface, that the respective said subscriber station can communicate on said direct mode channel.

7. The radiotelecommunications system according to claim 6, where:

said command comprises a priority arranged to cause at least some of said subscriber stations to move to said direct mode channel.

8. A subscriber station useful in a radiotelecommunications system which includes at least one exchange, at least one base station, and a plurality of subscriber stations, including said subscriber station, sharing radio channels, the at least one controller being arranged to allocate channel resources among the subscriber stations, including said subscriber station, said subscriber station comprising:

a transceiver for tuning to each of a plurality of radio channels, including at least one direct mode channel which is a shared one of said radio channels, said direct mode channel having a respective channel identifier, a user interface for transmitting information between a user of said subscriber station and said subscriber station, a controller for controlling the operation of said subscriber station in response to commands received from the user interface, said controller comprising means for tuning said transceiver of said subscriber station either alternatively by user control and by an overriding priority to communicate on said direct mode channel indicated by said channel identifier of said direct mode channel, and for informing the user of said subscriber station, via said user interface, that said subscriber station can communicate on said direct mode channel, and a memory means arranged to store the respective said channel identifier when contained in a command received by said subscriber station.

9. The subscriber station according to claim 8, wherein said controller further comprises:

means for comparing a priority contained in a command received by said subscriber station with the priority of an on-going call in which said subscriber station is participating and, if said priority contained in said command is higher than that of said call in which the subscriber station is participating, for tuning said transceiver of said subscriber station to communicate on said direct mode channel with others of said subscriber stations communicating on said direct mode channel.

* * * * *